United States Patent
Salerno

(10) Patent No.: US 7,099,320 B1
(45) Date of Patent: Aug. 29, 2006

(54) METHOD AND APPARATUS FOR DETECTION OF AND RESPONSE TO ABNORMAL DATA STREAMS IN HIGH BANDWIDTH DATA PIPES

(75) Inventor: Antonio Salerno, Woodside, CA (US)

(73) Assignee: Conxion Corporation, Santa Clara, CA (US)

( * ) Notice: Subject to any disclaimer, the term of this patent is extended or adjusted under 35 U.S.C. 154(b) by 1020 days.

(21) Appl. No.: 10/126,008

(22) Filed: Apr. 19, 2002

(51) Int. Cl.
*H04L 12/56* (2006.01)
*H04L 9/32* (2006.01)

(52) U.S. Cl. .................. 370/389; 370/392; 726/14; 709/224; 713/201

(58) Field of Classification Search ............... 370/389, 370/392; 726/14; 709/224–226; 713/201
See application file for complete search history.

(56) References Cited

U.S. PATENT DOCUMENTS

| | | | |
|---|---|---|---|
| 6,583,825 B1 * | 6/2003 | Yuen et al. .................. 348/731 |
| 6,789,203 B1 * | 9/2004 | Belissent .................... 726/22 |
| 2002/0107953 A1 * | 8/2002 | Ontiveros et al. .......... 709/224 |
| 2002/0107960 A1 * | 8/2002 | Wetherall et al. .......... 709/225 |

* cited by examiner

*Primary Examiner*—Chi Pham
*Assistant Examiner*—Ronald Abelson
(74) *Attorney, Agent, or Firm*—Morgan Lewis & Bockius LLP

(57) ABSTRACT

The method and apparatus of the present invention provide real time detection of abnormal data streams in high bandwidth data pipes, such as those found at network service provider data hubs. Abnormally high data volumes, for example, those associated with Denial of Service [DOS] attacks, may be detected and a mitigating response to the attack initiated. Further, certain counterattack steps are instituted including reverse tracing to determine the source of the attack and attack signature recording for later comparison to suspected new attacks. The method and apparatus of the present invention are such that the entire volume of data passing through a high bandwidth data pipe may be monitored on a real time basis providing early warning of DOS attacks for very large network address spaces.

17 Claims, 7 Drawing Sheets

METHOD AND APPARATUS FOR DETECTION OF AND RESPONSE TO ABNORMAL DATA STREAMS IN HIGH BANDWIDTH DATA PIPES

BRIEF DESCRIPTION

The subject of this invention relates to the data communications industry. Specifically, this invention describes a method and apparatus for determining the presence of abnormal data streams in high bandwidth data pipes and subsequent response decisions to mitigate the impact of the abnormal streams.

BACKGROUND OF THE INVENTION

The use of data communications networks has increased dramatically over the past ten years, driven by both technical progress, such as ease of use and economical access, and by necessity, for example the global business environment. Generally this progress has been good due to gains in efficiency and timeliness of information, resulting in more accurate data and hence better decision making. But as the use of networks increases by both private and public entities, so does the dependency upon the data carried over the networks. Attendant with the increased dependency is an increased vulnerability to attack by persons bent on mischief, for whatever reason.

While there has been an increase in the positive effects of wide-spread network use, so too there has been an increase in the negative effects. Specifically, the incidences of attacks by intruders, or so-called hackers, has seen dramatic increases, causing major network crashes such as those seen by Yahoo and eBay in late 1999. One such variety of attack, a Denial Of Service [DOS], also known generally as a "flood," effectively swamps the target network with so many requests for service that no response is possible, thereby debilitating a family of routers and possibly, in theory at least, an entire network. This is an extremely difficult attack to prevent for a variety of reasons, thus there exists a need to mitigate.

But mitigation is difficult because modern network architectures are susceptible to hostile attack. Reasons for this susceptibility are, among others, the global nature of the threat including both recreational and terrorist attackers, the multi-platform/multi-protocol nature of the networks involved, and the constant change taking place in the network community. As noted at the CERT® Distributed-Systems Intruder Workshop, "Intruders are actively developing distributed tools . . . " making attacks easier, in part " . . . because of the large number of machines 'available for public use.'" [Results of the Distributed-Systems Intruder Tools Workshop, Pittsburgh, Pa., Nov. 2–4 1999, p. 3]. Public use machines could be, for example, those located in libraries or academic computer labs and accessible to the general public. Such machines can be made the unwitting accomplices in a DOS attack, yielding a multiplier effect focused on the target server, router or network.

Attacks are made easier as well because it is difficult to separate legitimate traffic patterns from hostile patterns. Generally, network traffic may be separated into three broad categories: known good, known bad and questionable. Tools are prevalent which allow the determination of which category a specific data stream falls into, but each interferes with the data flow to one extent or another. Where the data flows are very high volume, as is the case in the emerging fiber optic network data pipes, this interference could become a burden on the system performance. Some current methods include serial data stream filtering, encryption, data stream sampling and data stream throttling.

By far the most widely used current method is serial filtering where all ingress data is sent through the filter and checked for known bad patterns. Encryption uses a key that is passed from client to server in order to validate the data. Sampling techniques look at random data streams over varying periods of time to recognize normal patterns. Throttling techniques involve reducing the amount of traffic allowed across the network in response to abnormal volume. Each of these methods, however, suffer from deleterious effects on the performance of the network ranging from mild to severe, depending upon the level of validation sought.

Further complicating the security problem is, that although intruder methods are well understood by those of skill in the art, an attack is difficult to detect until well after it is under way. Add to this the forging of IP addresses, or spoofing as it is called, the category of a particular data stream can be extremely difficult to determine in real time. All of the above mentioned methods suffer from this inability to rapidly detect an attack versus a legitimate variation in a data stream. While filtering methods may guarantee the validity of all data in a stream, it does so by severely limiting the amount of traffic that may pass. The same may be said about encryption and throttling to one extent or another. Sampling methods suffer from the inability to monitor the entire IP address space of a network in real time, thereby potentially missing the onset of an attack.

The present invention significantly advances the art through the ability to detect and react to certain types of attacks while they are commencing and to do so in the entire address space of a network. These and other advantages of the present invention are discussed in detail below in conjunction with the figures attached.

SUMMARY OF THE INVENTION

The method and apparatus of the present invention provide real time detection of abnormal data streams in high bandwidth data pipes, such as those found at network service provider data hubs. Abnormally high data volumes, for example, those associated with Denial of Service [DOS] attacks (e.g. request for service floods), may be detected at a very early stage and a mitigating response to the attack initiated. Further, certain counterattack steps are instituted including reverse tracing to determine the source of the attack and attack signature recording for later comparison to suspected new attacks. The method and apparatus of the present invention are such that the entire volume of data passing through a high bandwidth data pipe may be monitored on a real time basis providing early warning of DOS attacks for very large network address spaces.

The method of the present invention operates by continuously sampling the totality of data traffic in a high bandwidth data pipe in parallel with the normal operations of networks. Thus a Packet Activity Detector/Analyzer [PADA] looks at all packets traversing the data pipe while the routing and switching activity normally associated with network service continues uninterrupted.

The PADA steps through each IP address being serviced by the data pipe it is sampling comparing current packet volume with a dynamically updated reference volume. If the volume sampled is within tolerance no further action is taken with respect to the particular address being sampled. If the volume is outside of the reference tolerance, a second and then third review of the suspect data activity may be performed. The second review validates the packet format and the third review, if necessary, validates the packet content. As will be described in detail below, this three tiered analysis and comparison to reference data may be used to identify the commencement of a DOS attack at a very early stage.

Once an attack has been detected and/or confirmed several actions are taken including notification of an attack, tracing, and "fingerprinting" of the attack signature. A further advantage of the method of the present invention is the ability to handle an attack while continuing to monitor other normal traffic in the data pipe.

Since the traffic for a given IP address may legitimately demonstrate significant changes in volume, the method of the present invention provides a dynamic reference data update to accommodate such traffic pattern shifts. Thus yet a further advantage of the present invention is its ability to act as an advanced traffic profiler, allowing on-the-fly adjustments without triggering false attack reactions. This is accomplished by setting a normal volumetric tolerance, then comparing current volume to the reference over time. An attack will demonstrate a severe increase in volume in a very short period of time whereas a legitimate increase will exhibit a ramp characteristic. This difference permits the method of the present invention to discriminate between an attack and a legitimate upward shift in traffic volume.

DETAILED DESCRIPTION OF PREFERRED EMBODIMENTS

The present invention will be more clearly understood through a brief discussion of the environment in which the invention operates. Note that for the detailed discussion that follows the term 'data pipe' means a network segment terminating at a router.

Figure 1:
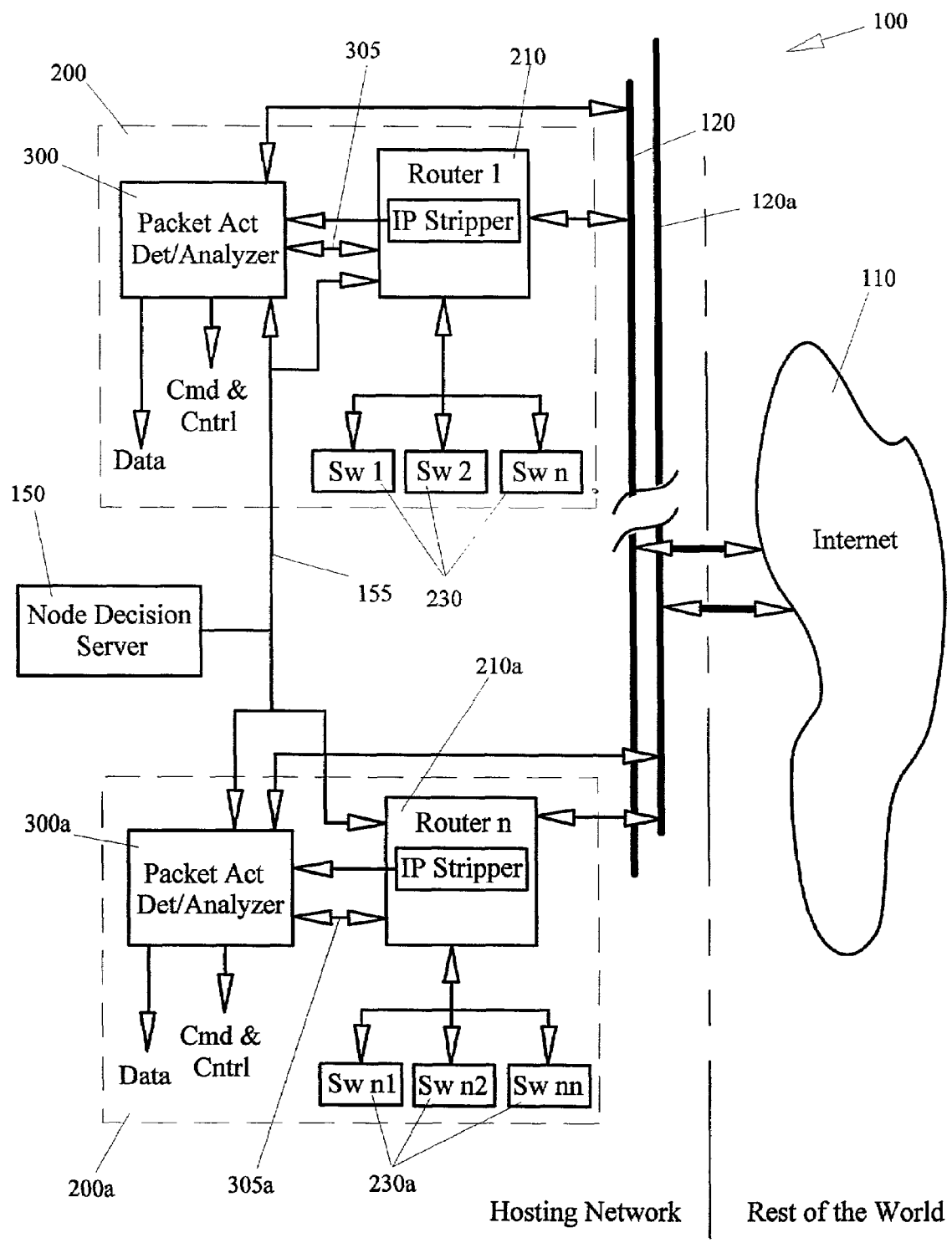
FIG. 1 is a high level block diagram of a system according to an embodiment of the present invention.

Referring to FIG. 1, a high level block diagram of a system 100 that can make use of the present invention is shown. The system comprises one or more hosting sites 200 and 200a connected to one or more data pipes 120 and 120a. Note that a specific site may contain one or more routers which may service one or more data pipes, and any specific router may be connected to one or more data pipes. The exact configuration does not affect the method of the present invention, thus the configuration shown in FIG. 1 is exemplary only.

Referring now to hosting site 200, a router 210 is connected to the Internet 110 via data pipe 120 in a manner well understood by those of skill in the art. Also connected to the Internet 110 is Packet Activity Detector/Analyzer [PADA] 300. PADA 300 is preferably connected in parallel to the router 210 to process data streams in the conventional way through router 210 while accomplishing attack detection on PADA 300 simultaneously. Router 210 provides IP address to the PADA 300 and switches 230 in the customary way, thus will not be discussed in any further detail. However, PADA 300 has the ability to query router 210 over path 305. This path is used for known protocol analysis purposes.

Note that in the embodiment of the present invention shown in FIG. 1, the PADA 300 and the router 210 are separate physical machines. It is possible, however, to combine the PADA 300 and the router 210 in the same physical machine. Thus the fact that they are shown separately is not a limitation on the scope of the invention and is done for clarity.

Router 210a and switches 230a located at hosting site 200a perform the same functions in the same way as their counterparts at hosting site 200. PADA 300a is attached in parallel with router 210a. In order to accommodate the high volume of data traffic being transported on the data pipes 120 and 120a, each router will have its own PADA operating in parallel monitoring the IP address space serviced by that router.

Node Decision Server 150 provides route optimization data via data path 155 to all servers on the network. The purpose of Node Decision Server 150 is, among other functions, to provide route outage data to the PADAs to help identify reasons for sudden increases in traffic. For example, Node Decision Server 150 keeps an updated database of all network route segments available for handling traffic. If one of these segments normally served by router 210a is dropped, for example by an equipment failure, the excess traffic might be diverted to router 210. Absent the data from the Node Decision Server 150, PADA 300 might react to the increased traffic as if it were an attack. However, with the added data from Node Decision Server 150, the PADA 300 will interpret the increase as legitimate and take no action. As well as route optimization data, the Node Decision Server 150 has the ability to query the router 210 via data path 155 for purposes of known protocol analysis in the same manner as described for the PADA 300 above.

Operation of the present invention proceeds through five general states, each discussed in detail below. By way of introduction, however, the present invention processes the totality of the address space serviced by its associated router in a maximum of three discreet polling cycles. Whether all three cycles are executed depends on the result of the previous cycle. As described in detail below, the three cycles are, in order, packet volume check, packet validation check and packet content check.

Packet volume check operates by an IP address pointer counter stepping serially through each address served by the associated router. If a packet volume check appears too high, the second cycle is initiated, and, in parallel, the next IP address is checked for volume. In this way, a continuous check of each IP address serviced by a given router may be made in real time.

By way of an example, consider a fiber optic data pipe capable of a 10 gigabyte egress data rate. To step through each possible address in the space a maximum of 10 minutes would be required using currently available commercial equipment. The reaction time of the PADA to an out-of-tolerance reading is less than three polling cycles, or roughly 18 seconds in a preferred embodiment. Thus every ten minutes and eighteen seconds the entire IP address space for the router is checked for an out-of-tolerance volume condition. In addition, the exact volume for each specific IP address is used to update a volume reference data base, thus normal periodic data stream fluctuations are accommodated without issuing false positive out-of-tolerance alarms.

If an out-of-tolerance volume condition is detected, the IP address involved is then subjected to the second tier review. In this polling cycle, the format of the data packets is reviewed. Should the packets contain invalid data, the third tier is entered where the data contained in the packet is validated. In this third tier cycle the data are compared to historically known bad data signature to attempt a match and subsequent identification of a known attack signature. If the identification is made then immediate remedial action is taken.

Supposing that the second and third tier reviews show no invalid packet formatting or no known bad data signature, and supposing further that the increased volume persists, alternative reasons for the increase are examined. For example, router outages or a new server being brought on line might cause a short term increase in traffic for a specific IP address. If the traffic appears to be legitimate, the volume reference data base is updated and the system returns to standard polling operations.

Figure 2:
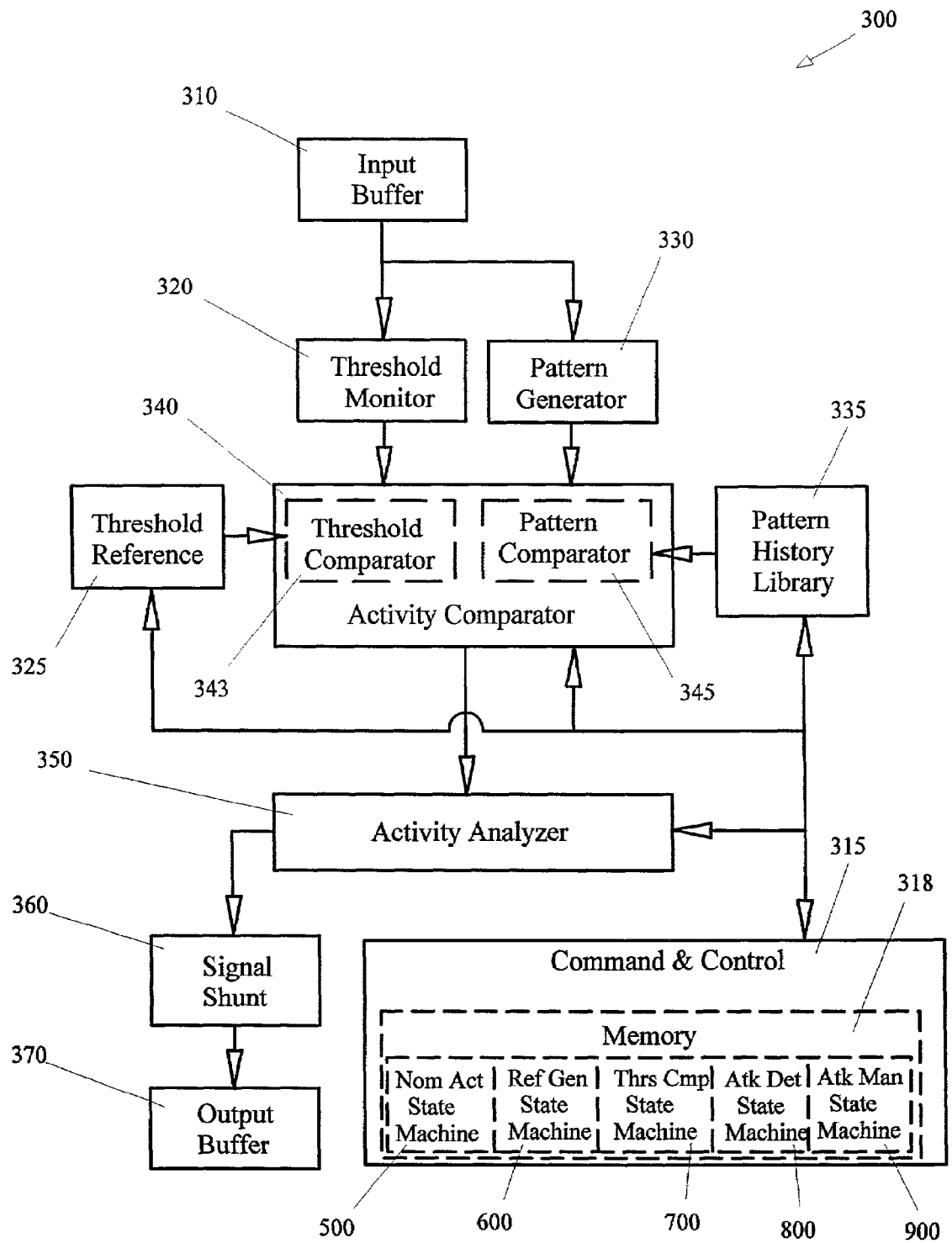
FIG. 2 is a block diagram of a Packet Activity Detector/Analyzer [PADA] apparatus according to an embodiment of the present invention.

Referring now to FIG. 2, a block diagram of a PADA 300 is shown. Input Buffer 310 is connected to the high volume data pipe and receives all packets being transported on the pipe. The buffered input data stream is passed to the Activity Comparator 340, containing the Threshold Monitor 320 and the Pattern Generator 330. The Pattern Generator 330 is used to provide input to the Pattern Comparator 345 in order to determine if a known attack signature is present while the Threshold Monitor 320 is used to generate the data packet volume for the current IP address.

The Threshold Monitor 320 passes its output to the Threshold Comparator 343. Also appearing as input to the Threshold Comparator 343 is data from the Threshold Reference 325. Each time the IP address counter is stepped, the volume reference data for that specific IP address is placed at the input to the Threshold Comparator 343. Output from the Threshold Comparator 343 is passed to the Activity Analyzer 350.

The Activity Analyzer 350 determines if the current data stream volume for the current IP address represents legitimate traffic using volume tolerance, route data, and other management data supplied to it by the Command and Control block 315. The output of the Activity Analyzer 350 passes to a Signal Shunt 360. If the volume has been determined to be illegitimate, the shunt dumps the data stream into a bit bucket for further analysis. If the data traffic is legitimate, the shunt simply passes the data stream to the Output Buffer 370 for normal processing.

Figure 6:
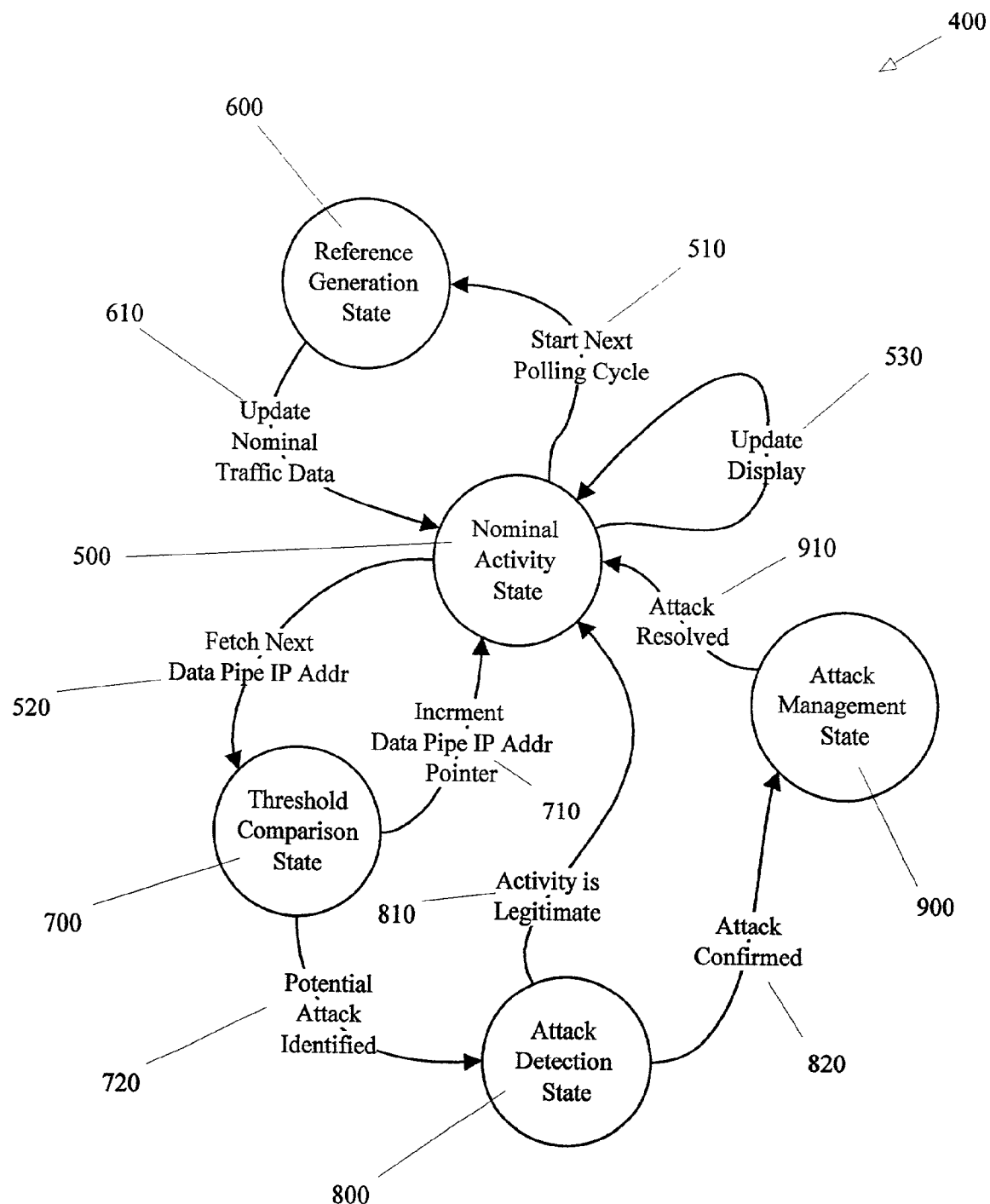
FIG. 6 is a top level state diagram illustrating an embodiment of the present invention.

Command and Control 315 provides the necessary administrative functions normal to computing devices, and will be well understood by those of skill in the art. Of importance within the Command and Control 315 is the Memory 318 containing the machine code representing the instruction necessary to implement the state machine of FIG. 6. As illustrated in FIG. 2, the Memory 318 contains a Nominal Activity State Machine 500, a Reference Generation State Machine 600, a Threshold Comparison State Machine 700, an Attack Detection State Machine, and an Attack Management State Machine 900. Each of these state machines will be discussed in detail below.

Figure 3:
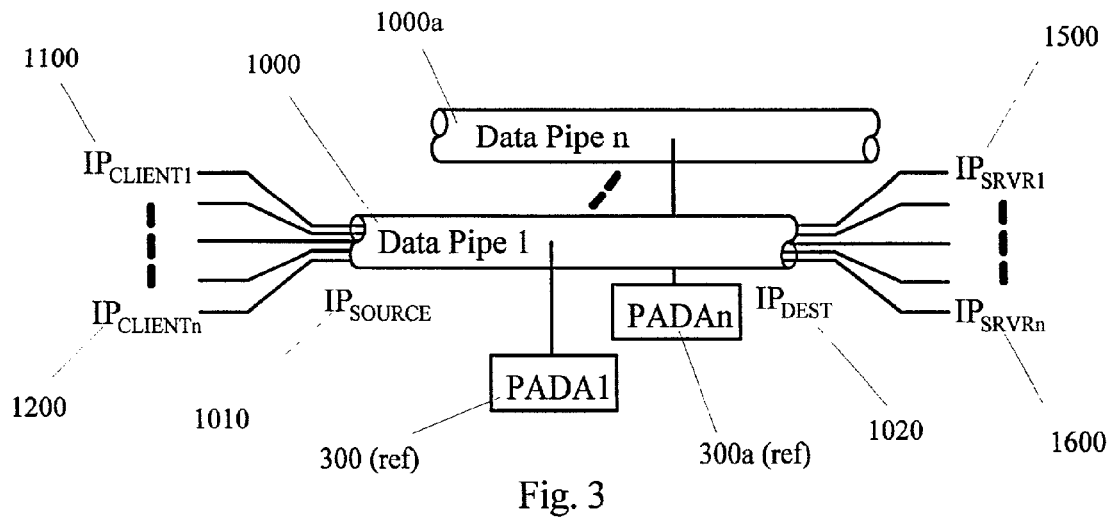
FIG. 3 is a schematic diagram of typical high bandwidth data pipes and placement of related PADAs that can make use of the method of the present invention.

FIG. 3 illustrates two typical high volume Data Pipes 1000 and 1000a of the type described above. Each of the data pipes has a PADA (300 and 300a (ref)) attached to it, and as described above, each will also be associated with a router which is not shown for clarity. Recall that the PADAs, preferably connected in parallel with their associated routers, receive all data packets being transported by their respective pipes.

Looking more closely at Data Pipe 1000, there exists at one end $IP_{SOURCE}$ 1010 comprised of $IP_{CLIENT1}$ 1100 through $IP_{CLIENTn}$ 1200. Each $IP_{CLIENT}$ represents a specific source IP address in the totality of IP source address space serviced by the Data Pipe 1000. At the other end of Data Pipe 1000 there exists $IP_{DEST}$ 1020 comprised of $IP_{SRVR1}$ 1500 through $IP_{SRVRn}$ 1600. Each $IP_{SRVR}$ represents a specific destination IP address in the totality of IP destination address space serviced by the Data Pipe 1000.

As is understood by those of skill in the art, typically an $IP_{CLIENT}$ will request service from an $IP_{DEST}$, and a data communication path will be established and maintained until the request is terminated. In a DOS attack, more than one $IP_{CLIENT}$ will request service from the same $IP_{DEST}$, or in other words, flood the server with requests for service, causing a data stream capacity overload to occur. More sophisticated floods using spoofed IP addresses to multiply the number of $IP_{CLIENT}$ requests can clog even the broadest band data pipes.

Figure 4:
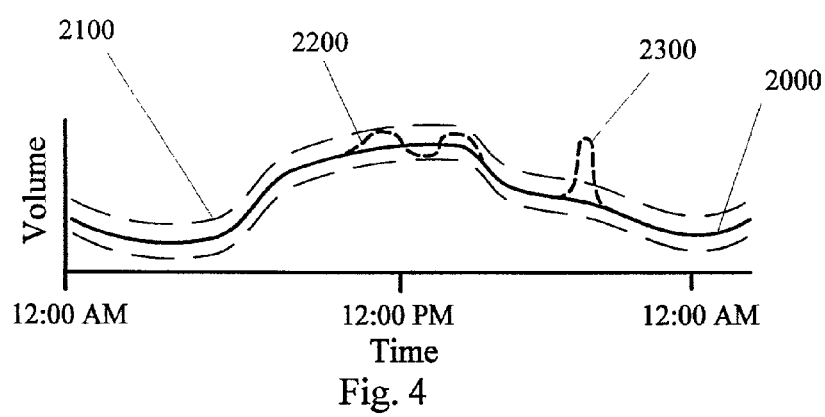
FIG. 4 is a plot illustrating a typical data abnormality that can be detected through the use of the method of the present invention.

FIG. 4 illustrates a typical periodic data stream 2000 volume over time. For example, the data volume at 12:00 AM is low, decreasing to a minimum in the early morning hours. However, at noon, or 12:00 PM, data volume reaches a mid-day peak. Shorter duration peaks and valleys may occur, such as depicted at 2200. These short term data stream anomalies typically vary less than +/−5% over a ten minute sampling period. Using the three tiered polling cycle described above, the PADA will allow these aberrations to pass unencumbered. Also shown in FIG. 4 is an out-of-tolerance data stream anomaly 2300. Here the volume aberration is well outside the tolerance band, and the attack slope so severe as to cause the PADA to treat the data stream anomaly 2300 as a possible attack. As will be discussed below, the PADA reaction takes different paths depending upon the amplitude and duration of the data stream aberration.

Figure 5:
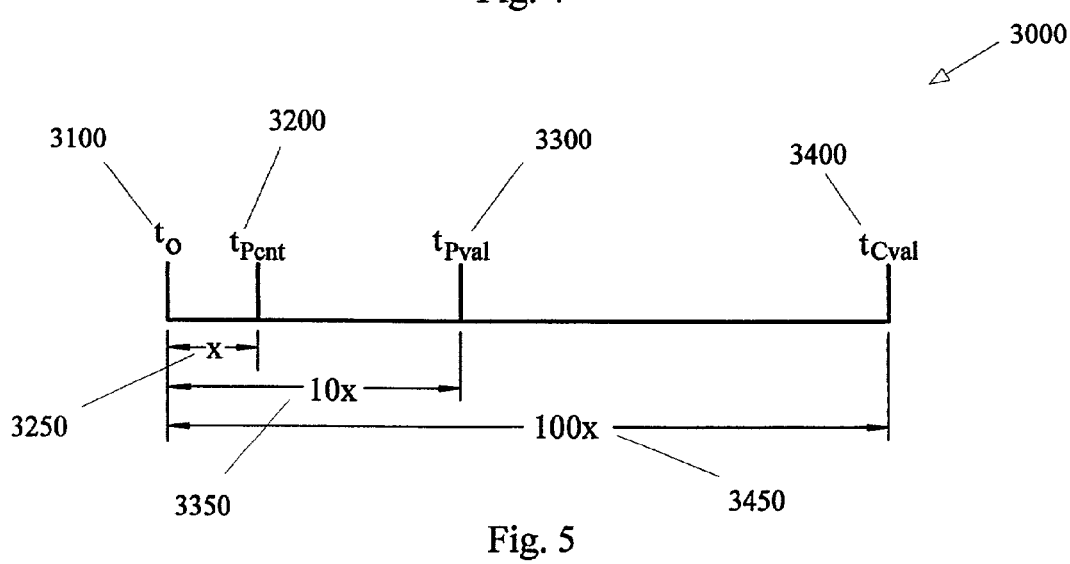
FIG. 5 is a plot of the sample rate timing for the parallel sampling of a high speed data pipe used in an embodiment of the present invention.

FIG. 5 defines the time relationship 3000 between the three polling cycles described earlier. The time $t_0$ 3100 is the start of a polling cycle for a specific IP address. The time $t_{Pcnt}$ 3200 is the point at which the packet count has been completed. The time $t_{Pval}$ 3300 is the point at which packet format validation has been completed, and the time $t_{Cval}$ 3400 is the time at which the packet content has been validated. As seen, each succeeding polling cycle is an order of magnitude greater in length than the preceding polling cycle. Also recall that when the time $t_{Pcnt}$ 3200 expires for the current IP address, the time $t_0$ 3100 for the next IP address begins. For the preferred embodiment of the present invention time x 3250 is 0.16 seconds, time 10+ 3350 is 1.6 seconds, and time 100× 3450 is 16 seconds. Including processor overhead, the total polling time for all three cycles is approximately 18 seconds.

The remaining figures, FIGS. 6 through 9, provide the details of the five operational states of the method of the present invention. Beginning with FIG. 6, the overall state diagram 400 shows a Nominal Activity State 500, a Reference Generation State 600, a Threshold Comparison State 700, an Attack Detection State 800, and an Attack Management State 900.

In the Nominal Activity State 500 three main activities are accomplished. First, the next polling cycle is started at 510, and the Reference Generation State 600 is entered. Then at 520 the next data pipe IP address is fetched in preparation for threshold measurement in the Threshold Comparison State 700. The last activity accomplished in this state is the update of any displays being monitored by human operators at Update Display 530. This nominal activity cycle continues unless and until inputs are received indicating some unusual event or activity have been detected.

The Reference Generation State 600, discussed in greater detail below, is used to dynamically compute any changes needed to the reference data stream volume used by the Threshold Comparator (343 of FIG. 2) and then updates the reference data at 610. The Threshold Comparison State 700 provides two outputs: a Potential Attack Identified signal at 720 and an Increment Data Pipe IP address pointer at 710. Should a Potential Attack Identified signal be generated as at 720, the Attack Detection State 800 either deliverers an Activity is Legitimate signal at 810 or an Attack Confirmed signal as at 820. The Attack Management State 900 accomplishes actions necessary to mitigate the attack and, when over, delivers an Attack Resolved signal 910 to the Nominal Activity State 500.

Figure 7:
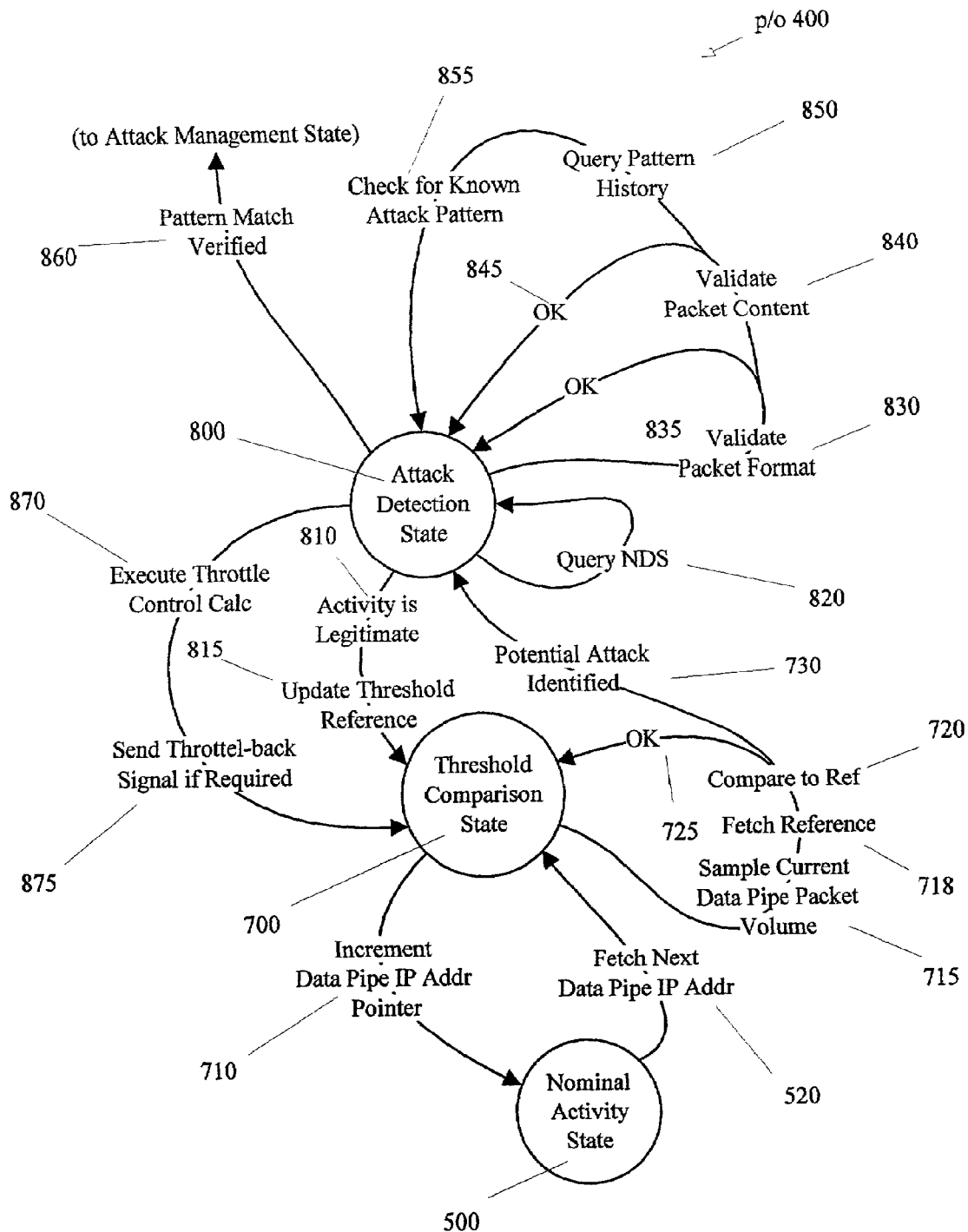
FIG. 7 is a state diagram illustrating the Threshold Comparison and Attack Detection states according to an embodiment of the present invention.

Turning now to FIG. 7, the Threshold Comparison State 700 and Attack Detection State 800, are shown in detail. Looking at the Threshold Comparison State 700, when a Fetch Next Data Pipe IP Address 520 is received from the Nominal Activity State 500 the current data pipe IP address packet volume is sampled at 715. The ~0.16 second sample time of the packet volume polling cycle is sufficient to provide an accurate reading of the total data stream volume for that IP address. The packet volume reference data for the current IP address is fetched as at 718 and at 720 it is compared to the sampled volume. If the packet volume is within tolerance the OK path at 725 is taken, the Data Pipe Address Pointer is incremented at 710 and the Nominal Activity State 500 reentered. If the packet volume is outside of tolerance, the Potential Attack Identified signal is given at 730 and the Attack Detection State 800 entered.

When the Potential Attack Identified signal 730 is given, it is not necessarily true that an attack is under way, but in order to free up the Nominal Activity and Threshold Comparison States (500 and 700 respectively) to continue to look at other IP addresses within the data pipe address space, the determination as to the nature of the out-of-tolerance condition is passed to the Attack Detection State 800. In this state the Node Decision Server [NDS] is queried at 820 to determine if an outage or route segment disturbance has created a spike in the affected data pipe IP data stream. If the answer is yes, then the data volume perturbation can be explained as legitimate, thus the Activity is Legitimate is given at 810, the Threshold Reference updated at 815 and the Threshold Comparison reentered.

Assuming for the moment that no route segment problems have been identified from the NDS, the packet format is checked at Validate Packet Format 830. If the format of the packets is proper, the OK is sent at 835 and the process returns, waiting for the next sample cycle approximately 10 minutes in the future. If the packet format was found to be invalid, the Validate Packet Content step 840 occurs. Should the content of the packet be found to be valid, the data is still assumed to be valid and the OK at 845 is sent. As with the Validate Packet Format step 830, the data stream is allowed to continue until the next cycle approximately 10 minutes in the future.

When that next cycle occurs, and finding that the volume is still out of tolerance and/or the packet format continues to be proper, the packet contents are reviewed at Validate Packet Content 840. If the content of packets is invalid the Query Pattern History step at 850 is executed and a check made for known attack signatures at Check for Known Attack Patterns 855. If a known pattern is matched, an identified attack is under way, the Pattern Match Verified is given at 860 and the Attack Management State (900 of FIG. 6) is entered.

If no match was found at Check for Known Attack Patterns 855 but the aberration continues, a manual intervention occurs by a human operator. A Throttle Control Calculation is made at 870 and a Throttle-back signal sent at 875. Note that while the preferred embodiment of the present invention utilizes human intervention for the throttle-back calculation, it should be recognized by those of skill in the art that this calculation could be reduced to machine executable instructions and thereby automated, thus this manual intervention is not meant as a limitation on the scope of the invention.

Figure 8:
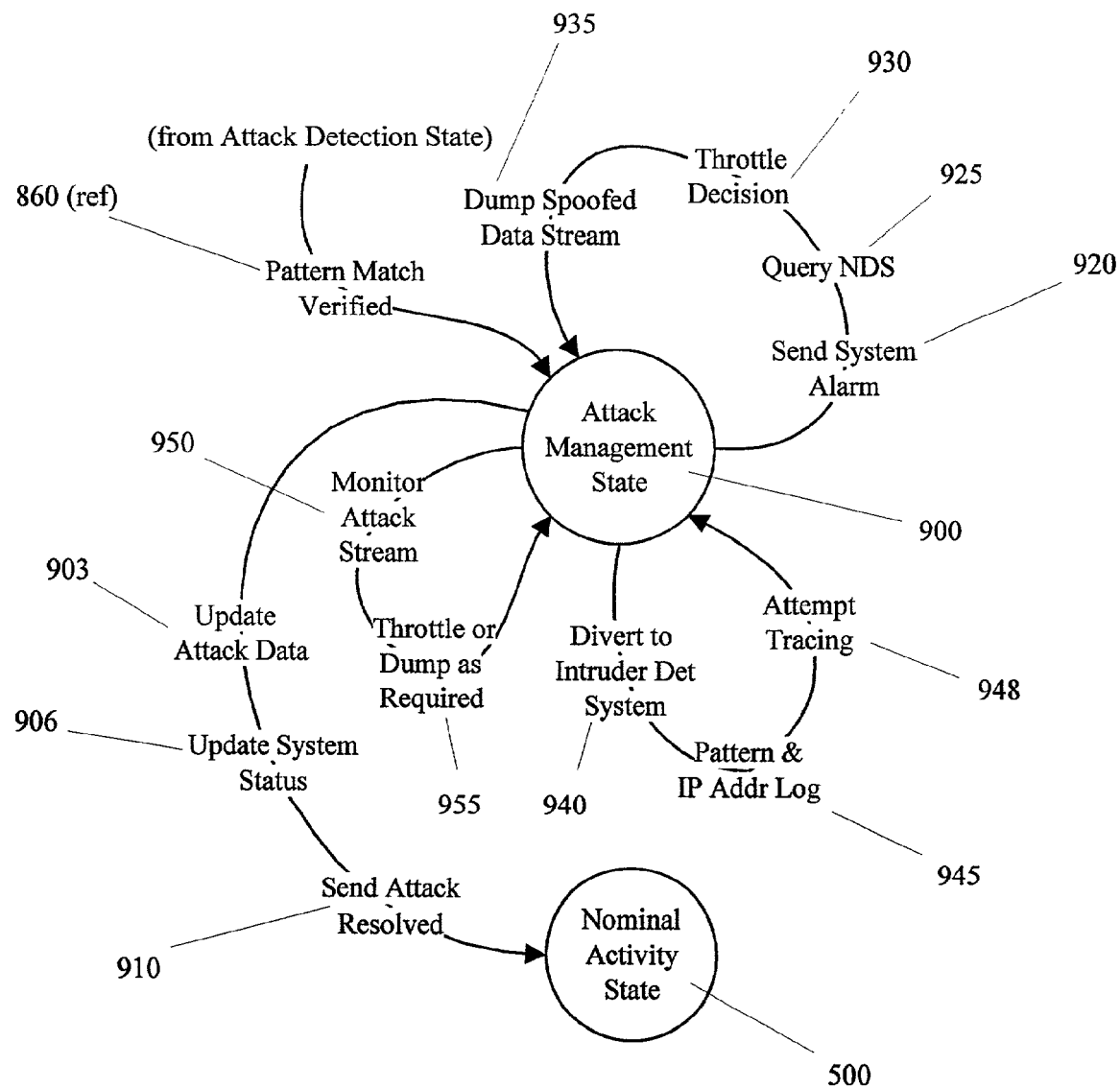
FIG. 8 is a state diagram illustrating the Attack Management state of an embodiment of the present invention.

Turning now to FIG. 8, and recalling from above that a Pattern Match Verified signal occurred at 860 (shown here for reference only), the Attack Management State 900, which is part of the overall state machine 400, is shown. Since a verified attack is occurring a Send System Alarm occurs at 920, followed by another query of the NDS at Query NDS 925. This additional NDS query cycle is accomplished both to assist in the tracing of the intruder and to confirm currently available routes and/or route outages that may be used for alternate service delivery. At this point, and again since a confirmed attack is under way, an automatic throttle-back is accomplished at Throttle Decision 930 in order to regulate the traffic volume in the affected data pipe, thereby preventing the type of DOS congestion sought by the intruder. If the data stream representing the DOS attack is coming from a spoofed IP address, as can be known through methods well understood by those of skill in the art, the data are eliminated from delivery to the targeted server at Dump Spoofed Data Stream 935.

The offending IP address that was eliminated from the delivery to the targeted server at Dump Spoofed Data Stream 935 is redirected to an intruder detection system at Divert to Intruder Det System 940. A number of such systems are commercially available, for example, the Cisco Secure IDS, manufactured by Cisco Systems, of San Jose, Calif. These systems assist in the rapid tracing of forged IP addresses and corrupted data analysis. The output of the intruder detection system is used to update the data bases at Pattern & IP Addr Log 945. By updating the data with each new occurrence of an attack, a library of known attacks and related addresses is built which further improves the ability of the present invention to detect future attacks. Tracing is attempted at Attempt Tracing 948, however as the sophistication of the intruder population increases, tracing becomes more and more difficult. This is so due to the forging of IP addresses and the use of many rouge machines, in many cases unwittingly, to make service requests simultaneously. This multiplier effect makes tracing of the true source of the attack quite a difficult proposition.

At this stage of a DOS attack the method of the present invention enters a monitor-and-react mode at Monitor Attack Stream 950. In this mode the activity on the offending IP address and its related data stream in monitored for volume increases and throttle adjustments made at Throttle or Dump as Required 955. Note that the activities of monitoring and tracing occur in parallel and continue throughout the life of the attack. Recall also that during the detection and management of an attack, the method of the present invention continues to look at the entire IP address space served by a given PADA. By so doing, the method of the present invention optimizes the detection of intruder DOS attacks while minimizing any deleterious effects on legitimate traffic over the related IP address space.

At some point in time the attack will have run its course. When this occurs the attack data are updated at Update Attack Data 903, the system updated at Update System Status 906 and an all clear signal sent at Send Attack Resolved 910. At this point the method of the present invention returns to the Nominal Activity State 500 and resumes normal operation.

Figure 9:
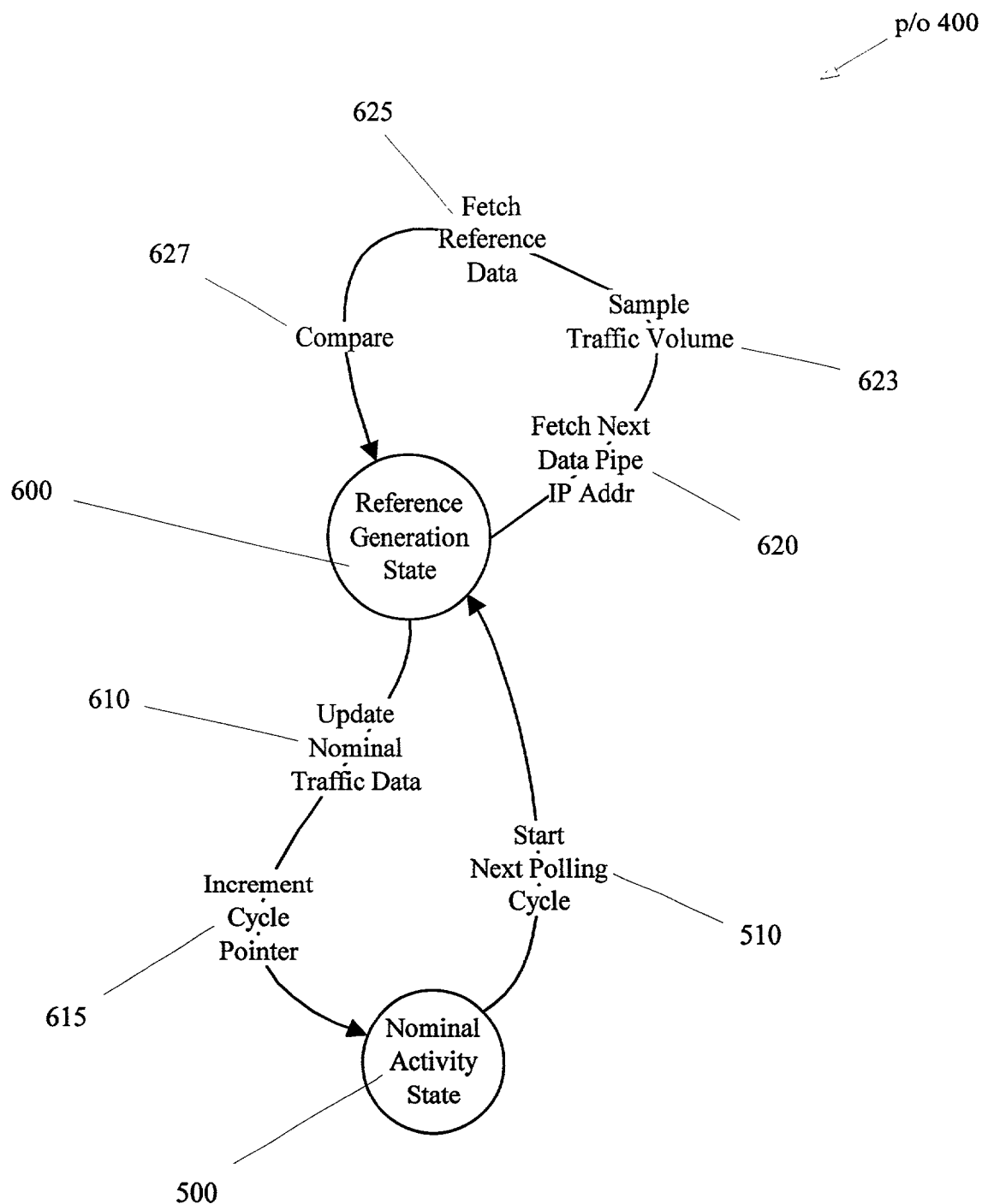
FIG. 9 is a state diagram illustrating the Reference Generation state according to an embodiment of the present invention.

FIG. 9 illustrates the Reference Generation State 600, which is part of the overall state machine 400. This state is entered from the Nominal Activity State 500 via Start Next Polling Cycle 510. Within the Reference Generation State 600 the next sequential IP address for the associated data pipe is fetched at Fetch Next Data Pipe IP Addr 620. The data stream volume for this IP address is sampled at Sample Traffic Volume 623. The reference data volume for the current IP address is fetched at Fetch Reference Data 625, then the two are compared at Compare 627.

The results of the comparison are updated at Update Nominal Traffic Data 610. By constantly cycling through the entire IP address space for a given data pipe and updating the data stream volumes related to the individual IP addresses, the method of the present invention is able to dynamically adjust for the normal periodic variations in data stream volume. These variations occur, for example, as a result of service demand peaks during the mid-day hours as shown in FIG. 4 above. By providing this dynamic adjustment capability, the present invention minimizes the occurrences of false positive detections of service request attacks. Once the nominal traffic has been updated the cycle pointer is incremented at Increment Cycle Pointer at 615, and the Nominal Activity State 500 reentered where normal operation continues.

A first advantage of the present invention is the rapid detection of known attack patterns over large IP address spaces in effectively real time. For the preferred embodiment of the present invention, a DOS attack in a 10 gigabyte data pipe can be detected in as little at 18 seconds to a maximum of 10 minutes and 18 seconds, depending on where in the IP address space cycle the IP address pointer is when the attack commences.

A second advantage of the present invention is the ability to isolate a rouge data stream while having minimal effect on throughput of legitimate traffic. Since the detection and reaction to an attack is accomplished on an address-by-address basis, normal activity in non-affected IP addresses continues unaffected. This can be done since the PADA, responsible for detection of, reaction to and management of an attack, is connected in parallel with its associated router. All legitimate traffic being handled by the router passes without throughput compromise.

A third advantage of the present invention is the constant update of forged IP addresses and corrupt data patterns in an attack reference data base. By providing a current library of known attack signatures, the method of the present invention is capable of more rapid confirmation of, and thus reaction to, known intruder behavior. This feature also aids the tracing activity of adjunct intruder detection systems.

A fourth advantage of the present invention is its advanced traffic profiling feature. This dynamic adjustment to periodic data volume changes reduces the incidence of false positive attack indications. The method of the present invention samples the data streams related to each of the IP addresses being serviced by a given router at a minimum of once every ten minutes. In so doing the volume variations associated with peak service periods are accommodated. False positive attacks are further reduced through use of a multi-tiered attack detection method that applies the dynamically updated volumetric data to rules based analysis for both packet and data validity.

A fifth advantage of the present invention is its scalable nature and platform independence. The method of the present invention can be programmed for use on a multitude of hardware platforms. It is scalable by the fact that as routers are added to a network system, additional PADAs can simply be added in parallel.

What is claimed is:

1. A method for detecting abnormal data streams in data pipes, comprising:
   sampling data packets transiting the data pipe;
   receiving an IP address for each said sampled data packet;
   determining a data packet volume associated with each received IP address;
   comparing said determined data packet volume with a predetermined packet volume for each said IP address, wherein said predetermined data packet volume includes a tolerance range;
   confirming format validity of data packets associated with data packet volumes outside said predetermined data packet volume and for unconfirmed data packet formats analyzing associated data packet content for known aberrant patterns; and
   diverting data packets containing known aberrant patterns.

2. The method of claim 1, wherein said sampling comprises continuously sampling all data packets in a high bandwidth data pipe.

3. The method of claim 1, wherein said tolerance range is about +/−5%.

4. The method of claim 1, wherein said confirming comprises:
   validating data packet format;
   validating data packet content if said format is not valid; and
   determining whether a current data pattern matches a known aberrant data pattern if said content is not valid.

5. The method of claim 4, further comprising querying a node decision server to determine whether an irregular route segment condition has created an out of tolerance condition.

6. The method of claim 5, further comprising updating the predetermined packet volume based on said node decision querying.

7. The method of claim 4, further comprising initializing diagnostic procedures to mitigate effects of and trace a source of said data packets containing known aberrant patterns.

8. The method according to claim 7, further comprising regulating traffic volume in an effected data pipe to eliminate a denial of service attack.

9. The method according to claim 8, further comprising updating a database of known aberrant data patterns based on the eliminated denial of service attack.

10. An apparatus for real time detection of abnormal data streams in data pipes, comprising:
- at least one node decision server; and
- at least one data packet analyzer communicating with the node decision server, wherein said data packet analyzer includes a memory containing instructions to
- sample data packets transiting the data pipe,
- obtain an IP address for each said sampled data packet,
- determine a data packet volume associated with each received IP address,
- compare said determined data packet volume with a predetermined packet volume for each said IP address,
- confirm format validity of data packets associated with data packet volumes outside said predetermined data packet volume and for unconfirmed data packet formats analyze associated data packet content for known aberrant patterns, and
- divert data packets containing known aberrant patterns.

11. The apparatus of claim 10, wherein said instructions in memory comprise instructions for operation of plural states, including:
- a nominal activity state;
- a threshold comparison state;
- a reference generation state; and
- an attack detection state, wherein said states cooperate to detect aberrant data streams in said data pipes.

12. The apparatus of claim 11, wherein said nominal activity state comprises instructions for directing operation to another of said operational states based on sampled data packets.

13. The apparatus of claim 11, wherein said threshold comparison state comprises instructions to sample dat pipe packet volume, fetch a reference volume, compare the sampled volume to the reference volume, identify a potential attack based on said comparison and increment a data pipe IP address pointer back to the nominal activity state.

14. The apparatus of claim 11, wherein said reference generation state comprises instructions to fetch a next data pipe IP address, sample traffic volume for said next IP address, fetch volume reference data for said next IP address, compare the reference and sample volumes, and updtate nominal traffic volume data based on the comparison.

15. The apparatus of claim 11, wherein said attack detection state comprises instructions to query the node decision server, validate the data packet format, validate the data packet content, query an attack pattern library for know attack patterns, and determine whether activity detected is legitimate activity or attack activity.

16. The apparatus of claim 11, further comprising instructions for an attack management operational state, said state comprising instructions to send a system alarm, monitor the attack stream, divert data packets to an intruder detection system and update stored attack pattern data.

17. The apparatus of claim 11, wherein:
- said apparatus further comprises instructions for an attack management operational state, said state comprising instructions to send a system alarm, monitor the attack stream, divert data packets to an intruder detection system and update stored attack pattern data; and
- said attack detection state comprises instructions to query the node decision server, validate the data packet format, validate the data packet content, query an attack pattern library for know attack patterns, determine whether activity detected is legitimate activity or attack activity; and direct operation to the attack management operational state in response to detected attack activity.

* * * * *